United States Patent
Cheng

(10) Patent No.: US 12,069,163 B2
(45) Date of Patent: Aug. 20, 2024

(54) DATA PROTECTION WITH TWO PASSWORD ASYMMETRIC ENCRYPTION

(71) Applicant: Capital One Services, LLC, McLean, VA (US)

(72) Inventor: Hao Cheng, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 216 days.

(21) Appl. No.: 17/874,362

(22) Filed: Jul. 27, 2022

(65) Prior Publication Data

US 2024/0039705 A1 Feb. 1, 2024

(51) Int. Cl.
*H04L 9/32* (2006.01)
*H04L 9/08* (2006.01)

(52) U.S. Cl.
CPC .......... *H04L 9/0825* (2013.01); *H04L 9/0863* (2013.01); *H04L 9/0894* (2013.01); *H04L 9/3213* (2013.01); *H04L 9/3226* (2013.01)

(58) Field of Classification Search
CPC ... H04L 9/0825; H04L 9/0863; H04L 9/0894; H04L 9/3213; H04L 9/3226
USPC ........................................................ 713/159
See application file for complete search history.

(56) References Cited

U.S. PATENT DOCUMENTS

| | | | | |
|---|---|---|---|---|
| 5,535,276 A | * | 7/1996 | Ganesan | H04L 9/0825 380/46 |
| 5,778,071 A | * | 7/1998 | Caputo | G06F 21/606 380/30 |
| 11,284,258 B1 | * | 3/2022 | Wei | H04L 63/10 |
| 11,456,863 B1 | * | 9/2022 | Conor | H04L 9/0861 |
| 11,729,150 B2 | * | 8/2023 | John | H04L 63/062 713/176 |

(Continued)

FOREIGN PATENT DOCUMENTS

WO 2016033610 A1 3/2016

OTHER PUBLICATIONS

Morris Dworkin "Recommendation for Block Cipher Modes of Operation: Methods for Format-Preserving Encryption" U.S. Department of Commerce NIST Special Publication 800-38G, http://dx.doi.org/10.6028/NIST.SP.800-38G, pp. 1-28, Mar. 2016.

(Continued)

*Primary Examiner* — Badri Narayanan Champakesan
(74) *Attorney, Agent, or Firm* — Banner & Witcoff, Ltd.

(57) ABSTRACT

Techniques for protecting data using two password asymmetric encryption based on time-constrained password-based partner tokens. To encrypt data, a first partner computing device receives a first partner token from a second computing device. The first partner computing device decrypts the first partner token to recover first public key data generated by the second partner computing device. The first partner computing device derives a cryptographic encryption key to encrypt the data based on the first public key data, and based on first private key data generated by the first partner computing device. The second computing device may decrypt the encrypted data based on a second partner token generated by the first partner computing device, using a cryptographic decryption key derived using second private key data generated by the second computing device and second public key data generated by the first computing device and embedded and encrypted in the second partner token.

20 Claims, 8 Drawing Sheets

(56) References Cited

U.S. PATENT DOCUMENTS

| | | | |
|---|---|---|---|
| 11,743,047 B2* | 8/2023 | Rahn | H04L 9/3213 |
| | | | 713/156 |
| 2015/0319151 A1* | 11/2015 | Chastain | H04L 9/083 |
| | | | 713/171 |
| 2020/0213111 A1* | 7/2020 | Leavy | H04L 9/3242 |

OTHER PUBLICATIONS

Nov. 8, 2023—(WO) International Search Report and Written Opinion—App No. PCT/US2023/028630.

* cited by examiner

DATA PROTECTION WITH TWO PASSWORD ASYMMETRIC ENCRYPTION

FIELD OF USE

Aspects of the disclosure generally relate to exchanging sensitive data and more specifically to techniques for encrypting data to exchange the sensitive data in a more secure and reliable manner.

BACKGROUND

Often, sensitive data is to be exchanged or shared. A conventional technique for sharing sensitive data involves encrypting data using a cryptographic key and subsequently decrypting the encrypted data using the same cryptographic key. This approach often requires the cryptographic key to be shared, rendering the cryptographic key vulnerable to a malicious actor. Even if steps are taken to protect the cryptographic key, there is still a non-negligible risk that the malicious actor may gain access to the cryptographic key, allowing the malicious actor to decrypt the encrypted sensitive data.

Aspects described herein may address these and other problems, and generally improve the security and reliability of exchanging sensitive data.

SUMMARY

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The present disclosure describes techniques for protecting data using two password asymmetric encryption.

To protect and securely exchange sensitive data, the present application describes methods, devices, systems, and/or instructions stored on non-transitory computer-readable media for generating a partner token by a first partner computing device that may be used by a second partner computing device to encrypt sensitive data or to decrypt encrypted data. The partner token may be time-constrained in that the partner token may only be used for a limited period of time by a corresponding partner computing device to encrypt or decrypt data. The partner token may include embedded and encrypted partner public key data generated by the first partner computing device based on a first password. The partner public key data may be used by the second partner computing device to derive a cryptographic key based on private key data generated by the second partner computing device and based on a second password. The partner public key data and the private key data may form an asymmetric key pair. The resulting cryptographic key may be used to encrypt data or decrypted encrypted data. Associating encryption and decryption to partner computing devices via the partner token maintains tight control on the devices that may encrypt or decrypt data. Further, the time-constrained nature of the partner token limits the time when such encryption or decryption may occur, thereby enhancing security. Further, the likelihood of a malicious actor compromising the techniques for encryption or decryption is reduced as private key data is never exchanged in the partner token.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
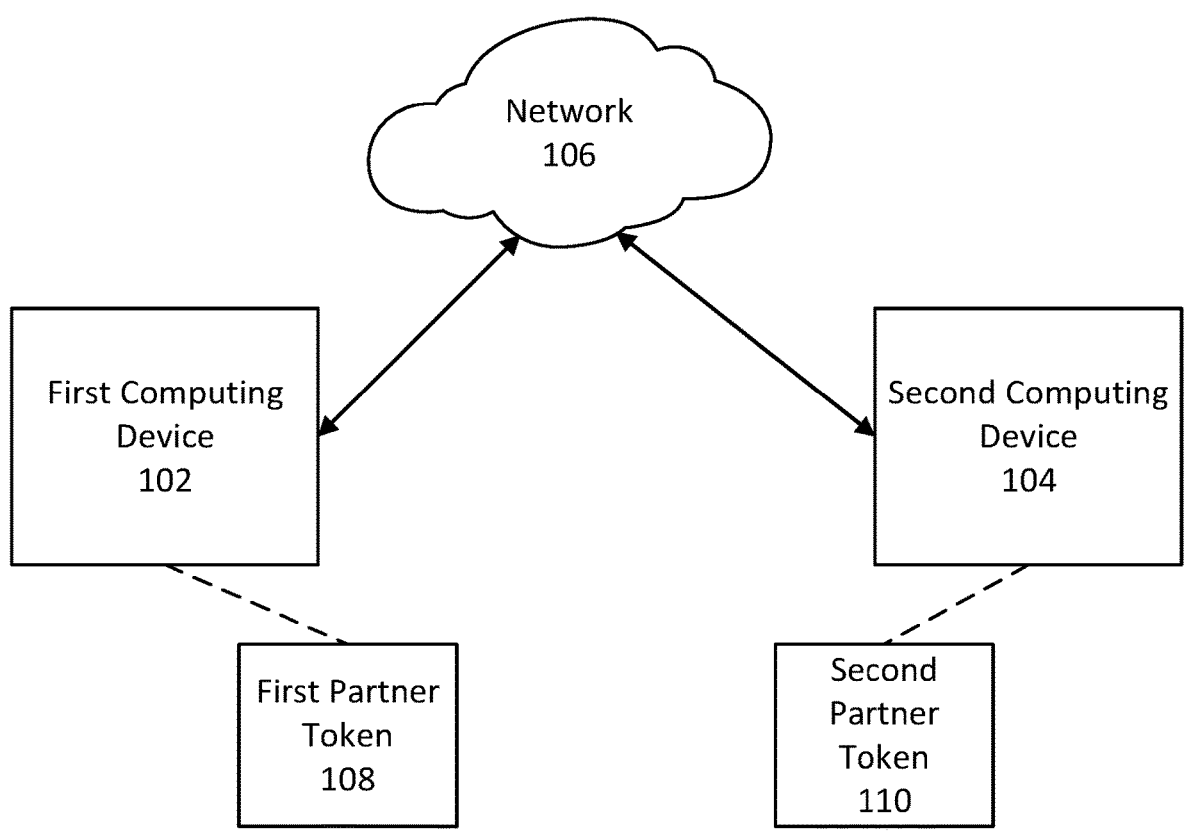
FIG. 1 shows an example of a system in which one or more features described herein may be implemented.

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or instructions stored on non-transitory computer-readable media for protecting data using two password asymmetric encryption based on partner tokens.

As an example, a partner token may be generated by a first computing device. A first password may be received by the first computing device. A first asymmetric key pair, comprising a first public key and a first private key, may be derived, by the first computing device, based on the first password. A first cryptographic key may be derived by the first computing device based on a current system time, a predetermined shared secret associated with the first computing device and a second computing device, and/or other cryptographic parameters. The first computing device may encrypt the first public key using the first cryptographic key to generate the partner token. The first computing device may share the partner token with the second computing device.

The second computing device may then use the partner token to encrypt sensitive data. As an example, the second computing device may derive the first cryptographic key based on the current system time, the predetermined shared secret associated with the first computing device and the second computing device, and/or the other cryptographic parameters. The second computing device may decrypt the partner token to recover the first public key. A second password may be received by the second computing device. A second asymmetric key pair may be derived based on the second password. The second asymmetric key pair may comprise a second public key and a second private key. A second cryptographic key may be derived by the second computing device based on the second private key and the first public key recovered from the partner token. The second computing device may then encrypt the data based on the second cryptographic key. The resulting encrypted data may then be shared with the first computing device.

The first computing device may receive the encrypted data and, at some time, may cause the encrypted data to be decrypted. As an example, the first computing device may receive a second partner token from the second computing device. The first computing device may decrypt the second partner token to recover the second public key. The first computing device may derive a third cryptographic key based on the first private key and the second public key recovered from the second partner token. The first computing device may then decrypt the encrypted data using the third cryptographic key to recover the original data.

In this manner, sensitive shared data may be shared. As an example, a first partner token generated by the first computing device may be used by a second computing device to generate a key that is used to encrypt sensitive data. The encrypted data may then be provided from the second computing device to the first computing device. At some later time, the first computing device may decrypt the encrypted data using a second partner token generated by the second computing device, thereby recovering the original data.

The techniques described herein allow sensitive data to be shared in a secure manner, by leveraging powerful cryptographic algorithms, key derivation processes, and/or data integrity checks. Further, the techniques described herein enable the sensitive data to be shared based on the use of partner tokens that only include embedded and encrypted public key data derived by a partner computing device. As such, asymmetric private key data is never shared, thereby reducing the likelihood that any cryptographic key, derived based on the private key data and public key data, is compromised by a malicious actor. Further, the partner tokens may be valid for a limited amount of time, which also reduces the likelihood that a malicious actor that gains access to a partner token may use it to decrypt encrypted data.

Having introduced exemplary features, discussion will now turn to a system that may implement the exemplary features and, in particular, to a system that may use two password asymmetric encryption to protect data.

FIG. 1 illustrates a system 100 for protecting data using two password asymmetric encryption according to one or more aspects of the disclosure. The system 100 may include a first computing device 102, a second computing device 104, and a network 106.

The first computing device 102 may be any type of computing device, including a mobile or a portable device. For example, the first computing device 102 may be a smartphone, a laptop, a tablet, a desktop, or an equivalent thereof. The first computing device 102 may be associated with a first user (e.g., "Alice"). The second user computing device 104 may also be any type of computing device, including a mobile or a portable device, and may be, for example, a smartphone, a laptop, a tablet, a desktop, or an equivalent thereof. The second computing device 104 may be associated with a second user (e.g., "Bob").

The network 106 may be any type of communications and/or computer network. The network 106 may include any type of communication mediums and/or may be based on any type of communication standards or protocols. The network 106 communicatively couples the first user computing device 102 and the second user computing device 104, to enable data or other information to be shared between the first computing device 102 and the second computing device 104.

To protect data, the first computing device 102 may generate a token 108. The token 108 may be considered to be a partner token that is time-constrained or time-sensitive (e.g., a partner token, a partner time-constrained token, partner time-constraint token, or a partner time-sensitive token). The token 108 may be valid for a limited duration or period of time. That is, the token 108 may be generated and then may be available to encrypt or decrypt data (e.g., sensitive data) for a limited period of time. The amount of time the token 108 may be valid (e.g., remains unexpired after generation) may be determined by a system that operates or provides the two password asymmetric encryption according to one or more aspects of the disclosure (e.g., determined by the first computing device 102 and/or the second computing device 104).

After generating the token 108, the first computing device 102 device may provide the token 108 to the second computing device 104. For example, the first computing device 102 may send or transmit the token 108 to the second computing device 104 via the network 106.

The token 108 may include a first embedded encrypted public key, of a first asymmetric key pair, generated, in part, based on a first password (e.g., a first password associated with the first user Alice and/or the first computing device 102). The second computing device 104 may generate a second asymmetric key pair (e.g., a second public key and a second private key) based, in part, on a second password (e.g., a second password associated with the second user Bob and/or the second computing device 104). The second computing device 104 may decrypt the first embedded encrypted public key from the token 108, for example, using a first symmetric key derived using a current system time, a predetermined shared secret associated with the first computing device 102 and the second computing device 104, and/or other cryptographic parameters. The second computing device 104 may use the first decrypted public key and the second private key to generate a second symmetric key. The second computing device 104 may then use the second symmetric key to encrypt (or decrypt) data (e.g., sensitive data). The encrypted data may then be stored or shared. As an example, encrypted data may be provided by the second computing device 104 to the first computing device 102. Additionally or alternatively, the encrypted data may be stored in a repository and, later, retrieved by the second computing device 104.

At a later time, it may be desired to decrypt the encrypted data. Further to the example described above, the first computing device 102 may want to decrypt the encrypted data provided by the second computing device 104. To do so, the second computing device 104 may be caused to generate a token 110 (e.g., a second token). As with the token 108, the token 110 may be considered to be a partner token that is time-constrained or time-sensitive such that it may be valid for a limited duration or period of time. That is, the token 110 may be generated and then may be available to decrypt the encrypted data for a limited period of time.

After generating the token 110, the second computing device 104 device may provide the token 110 to the first computing device 102. For example, the second computing device 104 may send or transmit the second token 110 to the first computing device 102 via the network 106.

The token 110 may include the second public key as an embedded encrypted second public key. The first computing device 102 may generate a first private key based, in part, on the first password (e.g., the first password associated with the first user Alice and/or the first computing device 102). The first computing device 102 may decrypt the second token 110 to recover the embedded second public key, for example, using the first symmetric key. The first computing device 102 may use the decrypted second public key and a first private key to generate a third symmetric key. The first computing device 102 may then use the third symmetric key to decrypt the encrypted data to recover the original sensitive data. The recovered data may then be stored. As an example, the recovered data may be stored by first computing device 102. Further, the recovered data may be used or consumed by the first computing device 102 and then destroyed, so as to reduce a likelihood that any unprotected data is compromised.

Based on the disclosure herein, including the examples discussed above, two different passwords may be involved in encrypting and decrypting data, and encryption and decryption of data may be based on asymmetric key pairs. For example, a first token may include embedded first public key data generated by a first partner computing device. The first public key data may be recovered by a second partner computing device and used, with second private key data generated by the second partner computing device, to encrypt the data. A second token may include an embedded second public key generated by the second partner computing device. The second public key data may be recovered by the first partner computing device and used, with first private key data generated by the first partner computing device, to decrypt the data. As described further herein, data protection is enhanced by the use of different time-constraint tokens to encrypt and decrypt the data, while using asymmetric key encryption based on two different passwords.

Figure 2:
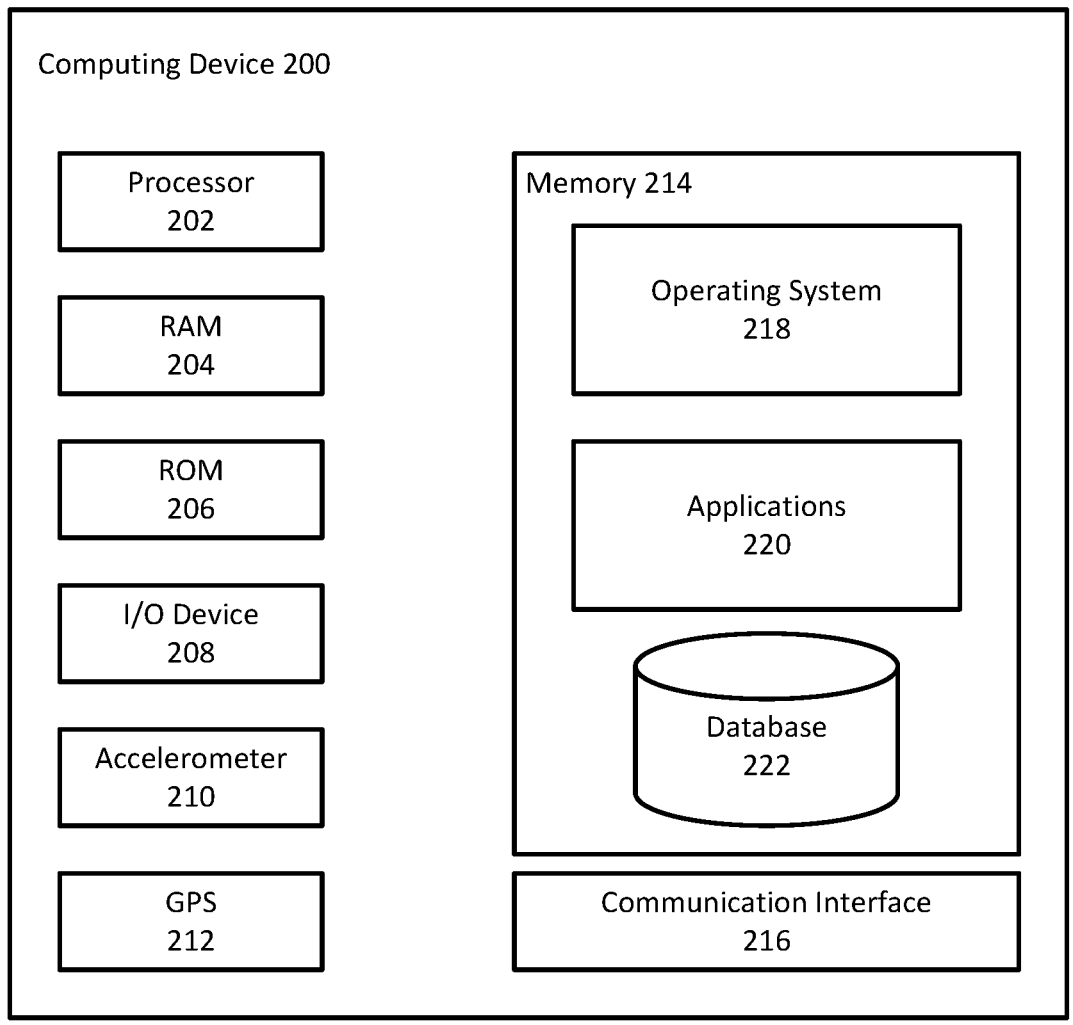
FIG. 2 shows an example computing device.

Any of the devices, components, and/or systems described herein may be implemented, in whole or in part, using one or more computing devices described with respect to FIG. 2. Turning now to FIG. 2, a computing device 200 that may be used with one or more of the computational systems is described. The computing device 200 may comprise one or more processors 202 for controlling overall operation of the computing device 200 and its associated components, including random access memory (RAM) 204, read-only memory (ROM) 206, input/output device 208, accelerometer 210, global-position system (GPS) antenna 212, memory 214, and/or communication interface 216. A bus (not shown in FIG. 2 for simplicity) may interconnect processor(s) 202, RAM 204, ROM 206, I/O device 208, accelerometer 210, global-position system receiver/antenna 212, memory 214, and/or communication interface 216. Computing device 200 may represent, be incorporated in, and/or comprise various devices such as a desktop computer, a computer server, a gateway, a mobile device, such as a laptop computer, a tablet computer, a smartphone, any other types of mobile computing devices, and the like, and/or any other type of data processing device.

Input/output (I/O) device 208 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 214 to provide instructions to processor 202 allowing computing device 200 to perform various actions. For example, memory 214 may store software used by the computing device 200, such as an operating system 218, application programs 220, and/or an associated internal database 222. The various hardware memory units in memory 214 may comprise volatile and nonvolatile, removable and non-removable media implemented in any method or technology for storage of information such as computer-readable instructions, data structures, program modules, or other data. Memory 214 may comprise one or more physical persistent memory devices and/or one or more non-persistent memory devices. Memory 214 may comprise RAM, ROM, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 202.

Accelerometer 210 may be a sensor configured to measure accelerating forces of computing device 200. Accelerometer 210 may be an electromechanical device. Accelerometer 210 may be used to measure the tilting motion and/or orientation computing device 200, movement of computing device 200, and/or vibrations of computing device 200. The acceleration forces may be transmitted to the processor 202 to process the acceleration forces and determine the state of computing device 200.

GPS receiver/antenna 212 may be configured to receive one or more signals from one or more global positioning satellites to determine a geographic location of computing device 200. The geographic location provided by GPS receiver/antenna 212 may be used for navigation, tracking, and positioning applications. In this regard, the geographic may also include places and routes frequented by the first user.

Communication interface 216 may comprise one or more transceivers, digital signal processors, and/or additional circuitry and software, protocol stack, and/or network stack for communicating via any network, wired or wireless, using any protocol as described herein.

Processor 202 may comprise a single central processing unit (CPU), which may be a single-core or multi-core processor, or may comprise multiple CPUs. Processor(s) 202 and associated components may allow the computing device 200 to execute a series of computer-readable instructions (e.g., instructions stored in RAM 204, ROM 206, memory 214, and/or in other memory of computing device 200) to perform some or all of the processes described herein. Although not shown in FIG. 2, various elements within memory 214 or other components in computing device 200, may comprise one or more caches, for example, CPU caches used by the processor 202, page caches used by the operating system 218, disk caches of a hard drive, and/or database caches used to cache content from database 222. A CPU cache may be used by one or more processors 202 to reduce memory latency and access time. A processor 202 may retrieve data from or write data to the CPU cache rather than reading/writing to memory 214, which may improve the speed of these operations. In some examples, a database cache may be created in which certain data from a database 222 is cached in a separate smaller database in a memory separate from the database 222, such as in RAM 204 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Discussion will now turn to generation of a time-constraint token that may include embedded public key data and that may be used to encrypt or decrypt data.

Figure 3A:
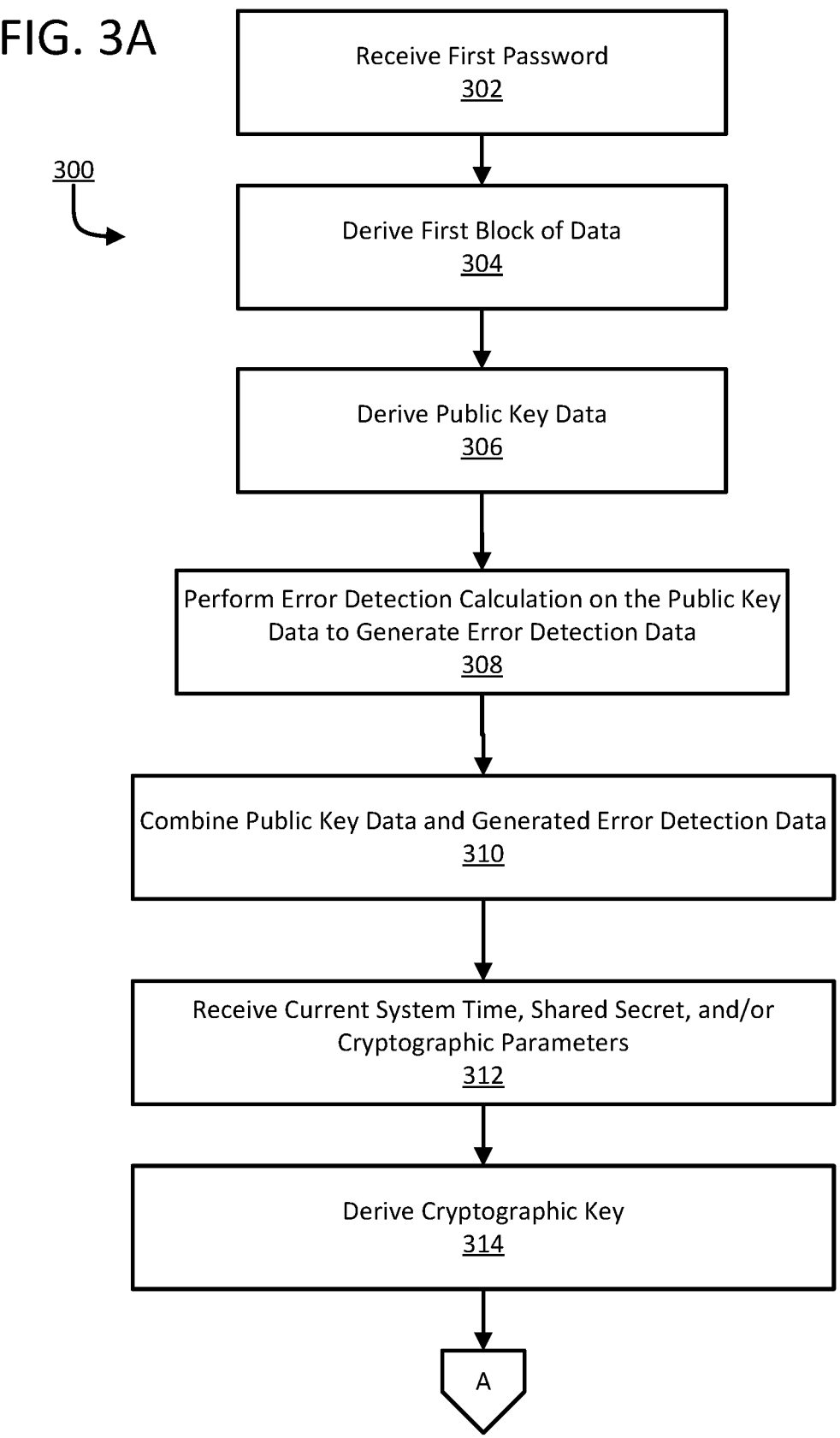
FIGS. 3A and 3B show an example of a process for generating a partner token according to one or more aspects of the disclosure.
Figure 3B:
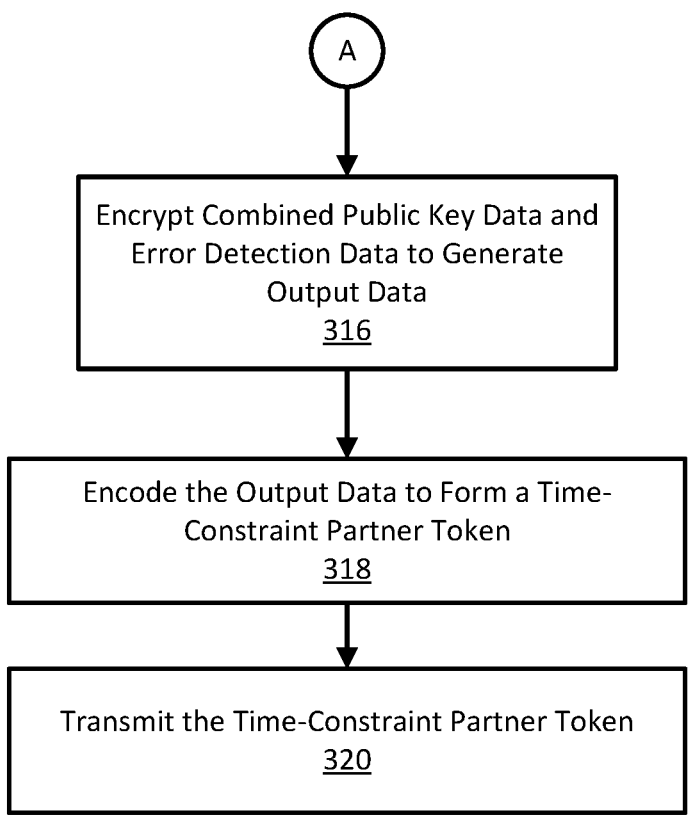

FIGS. 3A and 3B show a flow chart of a process 300 for generating a token according to one or more aspects of the disclosure. As described herein, the token may be considered to be a partner token. The token may be the token 108 or the token 110. The process 300 may represent a portion of a process for protecting data using two password asymmetric encryption according to one or more aspects of the disclosure. For example, the process 300 may represent a process by which a first computing device (e.g., the first computing device 102 of FIG. 1) generates a token and then provides (e.g., via the network 106) the token to a second computing device (e.g., the second computing device 104 of FIG. 1), which may then use the token to encrypt or decrypt data (e.g., sensitive data).

Some or all of the steps of process 300 may be performed using one or more computing devices (e.g., an application executing on a computing device) as described herein, including, for example, a client device, a server, or a memory and a processor configured to perform the methods described herein. For example, any portion of the process may be performed using the first computing device 102 of FIG. 1, the second computing device 104 of FIG. 1, or the computing device 200 of FIG. 2.

In step 302, a first computing device may receive a first password. The first password may be associated with a first user (e.g., "Alice") and/or may be associated with the first computing device. The first password may comprise any type of data or information, including, for example, an alphanumeric password, a biometric password, or any equivalent thereof. The first password may be stored in a memory associated with and/or accessible by the first computing device. The first password may be data provided by the first user (e.g., inputted by the first user). In one example, the first password may be "AlicePassword."

In step 304, a first block of data may be derived. The first block of data may be derived using a first key derivation function and based on the first password. The first block of data may be derived to be of a first desired size (e.g., having a desired length, a desired number of characters or components, a desired number of bits, etc.). The first key derivation function may be any key derivation function including, for example, the Password-Based Key Derivation Function 1 (PBKDF1), the Password-Based Key Derivation Function 2 (PBKDF2), the bcrypt key derivation function, the scrypt derivation function, etc.

As an example, the first key derivation function may be the PBKDF2 key derivation function, and the derivation of the first block of data may be based on one or more predetermined or otherwise known or specified configuration parameters such as, for example, a cryptographic salt, a number of desired iterations, a password (e.g., the first password), and/or a desired length (e.g., bit length) of the first block of data. The cryptographic salt may comprise a predetermined or otherwise known or specified sequence of bits. Further, the derivation of the first block of data may be based on a specified hashing algorithm such as, for example, Secure Hash Algorithm (SHA) 256 (SHA256).

In one example, a first user, "Alice" may provide her password, "AlicePassword," to the first computing device in step 302. In step 304, the first block of data may be derived using the PBKDF2 key derivation function, with a number of iterations specified to be "4096," the cryptographic salt specified to be "saltSALT," the password specified to be the "AlicePassword" (e.g., the first password), and the hashing algorithm specified to be SHA256. Under such a scenario, the first block of data may be derived to be: "ec77903507dc0c34f59d48da06b40f2ea62b1c40192cbaed8 38787fdad914aa5fa03 52e0e6552682140adc18da8c4e 2eed84f89bfda1ad5cf092617900d230a69a47a633e ce1d19a71".

In step 306, a first asymmetric key pair may be derived using a second key derivation function and based on the first block of data of the first desired size. The first asymmetric key pair may comprise first public key data (e.g., a first public key) and/or first private key data (e.g., a first private key). The first block of data of the first desired size may be considered to be a byte block. The second key derivation function may be any key derivation function, agreement, or protocol, including, for example, the Elliptic-curve Diffie-Hellman (ECDH) protocol or the Rivest Shamir Adelman (RSA) algorithm.

As an example, the second key derivation function may be the ECDH P-521 protocol, and the derivation of the first asymmetric key pair may be based on one or more predetermined or otherwise known or specified configuration parameters. Further, after the first asymmetric key pair is derived, the first private key may be discarded. The derived first public key may be used to derive a symmetric key (e.g., an Advanced Encryption Standard (AES) key) using private key data (e.g., a second private key), as described further herein.

In one example, the second key derivation function may be the ECDH P-521 protocol and the first block of data may be as shown in the example discussed above. As a result, the private key (e.g., the first private key) may be derived to be:
"f59d48da06b40f2ea62b1c40192cbaed838787fdad914aa 5fca3128553ebb1524864 ac6768e033aaa266f0164 bf7a5b2da25ab45ba84e2e93c318f9cfdb84f41a2",
which may be discarded, and the public key (e.g., the first public key) may be derived to be:
"040031 a892095b54288d21336291be0e993a2c28 de1e9eeaba177195530346b2646 2b21e06cc696072 b7ee93714a75b7cc84a9461cd5b229c3acdf610342369 6a443e80 0520bd7cfa4bd5a2d764340 43e5f8b12533b69ab2cfe0e0df283c97eb2b3f4db54678 bd9560af21c6a23e3ed3a6d2ab4ddb82b3e1657614eb5 1701518975b96f0f".

In step 308, an error detection calculation may be performed on the derived public key to generate error detection data. The error detection calculation may be based on any type of error detection calculation or algorithm, such as, for example a cyclic redundancy check (CRC) algorithm. The error detection calculation may be a message authentication code (MAC), such as a hash-based message authentication code (HMAC). The error detection calculation may be based on the Secure Hash Algorithm 1 (SHA-1).

In one example, the error detection calculation may be based on SHA-1 and may be performed on the public key as shown in the example discussed above. As a result, the generated error detection data may be a checksum that may be calculated to be: "7fe577b0644f64e06a8a5 a730bc9da33e1e2bf8c".

In step 310, the public key and the generated error detection data may be combined. The public key and the generated error detection data may be combined in any manner. As a first example, the public key and the error detection data may be combined by concatenating the public key and the error detection data in a predetermined manner. As a second example, the public key and the error detection data may be combined by interleaving according to a predetermined interleaving pattern. In one example, the public key and the generated error detection data may be combined by concatenation such that the error detection data is appended to the public key.

In step 312, the first computing device may receive a current system time, a predetermined shared secret, and/or cryptographic parameters. The current system time may represent any time or measure of time accessible to the first computing device and the second computing device. The current system time may comprise a value or other measure of time indicating an amount of time that has elapsed from some predetermined prior time or previous point in time. As an example, the predetermined prior time may be a particular point in time (e.g., Jan. 1, 2015) and the current system time may be expressed as a number of hours or a number of minutes since the particular point in time (e.g., 63,131 hours). The current system time may be determined using an epoch converter. The current system time may be derived based on a system clock shared or otherwise available to the first computing device and the second computing device. The system clock may be tamper-proof (e.g., incapable of being tampered with) and may be accessible to the first computing device and the second computing device. The system clock may provide a time to an epoch converter which derives the current system time as described herein.

The predetermined shared secret may be a master password or other secure data. The predetermined shared secret may be stored and/or otherwise accessible to the first computing device and the second computing device. The predetermined shared secret may be derived using a private key of the first computing device and a public key of the second computing device. A first asymmetric key pair of the first computing device and a second asymmetric key pair of the second computing device may be determined using any key derivation protocol or algorithm including, for example, Elliptic Curve Cryptography (ECC), RSA, etc. The predetermined shared secret may be generated using any suitable key agreement protocol, including, for example, ECDH. The predetermined shared secret may comprise any data or value. The predetermined shared secret may represent information that is well-protected and highly unlikely to be shared or compromised, and only known to the first computing device and the second computing device. The predetermined shared secret may represent a seed of a key derivation function.

The cryptographic parameters may be any parameter used as an input into a key derivation algorithm or protocol including, for example, PBKDF1 or PBKDF2. As an example, the cryptographic parameters may comprise an indication of a number of iterations desired for PBKDF2. In general, an output of a key derivation process may be more secure as the number of iterations is increased. The cryptographic parameters may be stored and/or otherwise accessible to the first computing device and the second computing device.

The current system time, the predetermined shared secret, and/or the cryptographic parameters may be associated with a key derivation function, algorithm, or protocol. As an example, the current system time, the predetermined shared secret, and/or the cryptographic parameters may be associated with the PBKDF2 key derivation function.

In one example, the current time may be "2022-03-08 12:56:50," such that the current system time, "t," may be: "27446036" (e.g., minutes from epoch). Further, a cryptographic salt of the PBKDF2 key derivation function may be set to be equal to the value "t" (e.g., the current system time expressed as minutes from epoch).

In step 314, a first cryptographic key (e.g., a first symmetric key) may be derived. The first cryptographic key may be derived using a third key derivation function. The third key derivation function may be any key derivation function including, for example, the PBKDF2 key derivation function. The first cryptographic key may be derived based on the current system time, the predetermined shared secret, and/or the cryptographic parameters. For example, the current system time, the predetermined shared secret, and/or the cryptographic parameters may represent input parameters to the third key derivation function. Other input parameters to the key derivation function may include a desired length of the output of the key derivation function. The first cryptographic key may be considered to be an AES encryption key.

In one example, the first cryptographic key may be derived based on the predetermined shared secret, the current system time, and/or the cryptographic parameters. The current system time may be used to form a cryptographic salt of the third key derivation function (e.g., "t," or "27446036" as described above). The cryptographic parameters, for example, may specify a number of iterations and/or a hash algorithm. The shared secret may be set to be "secretSECRET." Under such a scenario, the first cryptographic key may be derived to be: "9c449a32a366d25f31b937861af813e208a74f1713071981 31e2f640ee215671".

In step 316, the combined first public key and error detection data from step 310 may be encrypted. As described herein, the first cryptographic key derived in step 314 may be a symmetric key used to encrypt the combined first public key and error detection data. As a result of encrypting the combined first public key and error detection data using the first cryptographic key, output data may be generated.

In step 318, the output data may be encoded to form a first time-constraint token. The output data may be encoded in any manner. As an example, the output data may be encoded into a Base64 string.

In one example, the first public key and the error detection data may be concatenated in step 310 (e.g., with the error detection data appended to the public key data). This combined data may then be encrypted using the first cryptographic key derived in step 314 (e.g., symmetric key) and as described in the example above. After encrypting, the output data may be converted to a Base64 string to generate the following time-constraint token (e.g., partner token): "7ZC6MRGvMgJkIB Qra3CbiTQ4ie26VCJeGGk4IVc1 Yj8WuCb9Qm3vQLa7Wx Eg5X_AhxcSM461yDN6c92g H9CHd4Qz6_6Gs0hRa3cQSzLr9bqw1JSsZowgGp3 pU0EOSuYvYQziU5VZOUnxIg1TL0OK8rTMjShCMMv GTD1kCI0aqURhYx1Jh LkRivnew1BzzqBEQaKrYJf FbCBnqmSSfD3-pOkEKhXTyyxF4Q==".

In step 320, the first computing device (e.g., the first computing device 102) may send (e.g., transmit over the network 106) the time-constraint token to the second computing device (e.g., the second computing device 104). The second computing device may then use the time-constraint token to encrypt or decrypted data as described further herein.

The steps of process 300 may be performed in any suitable order, and any step may be combined with another other step of process 300.

As will be appreciated based on the discussion provided herein, the process 300 enables a computing device to generate a time-constraint token that may be provided to a partner computing device to encrypt or decrypt data. As described herein, the process 300 provides for public key data to be embedded and encrypted within the time-constraint token. The token may be time-constrained as it is tied to a time (e.g., dependent upon the current system time) and any system that allows for use of the time-constraint token may indicate an amount of time the token may be valid (e.g., unexpired). In an example, validity may be determined based on the current system time when the token is to be used, in comparison to the current system time when the token was generated. This enables the token to be used to encrypt or decrypt data for only a predetermined allowed amount of time (e.g., a token validity period).

Having discussed the generation of a token with respect to FIGS. 3A and 3B, discussion will now turn to use of a token generated by the process 300 to encrypt data.

Figure 4A:
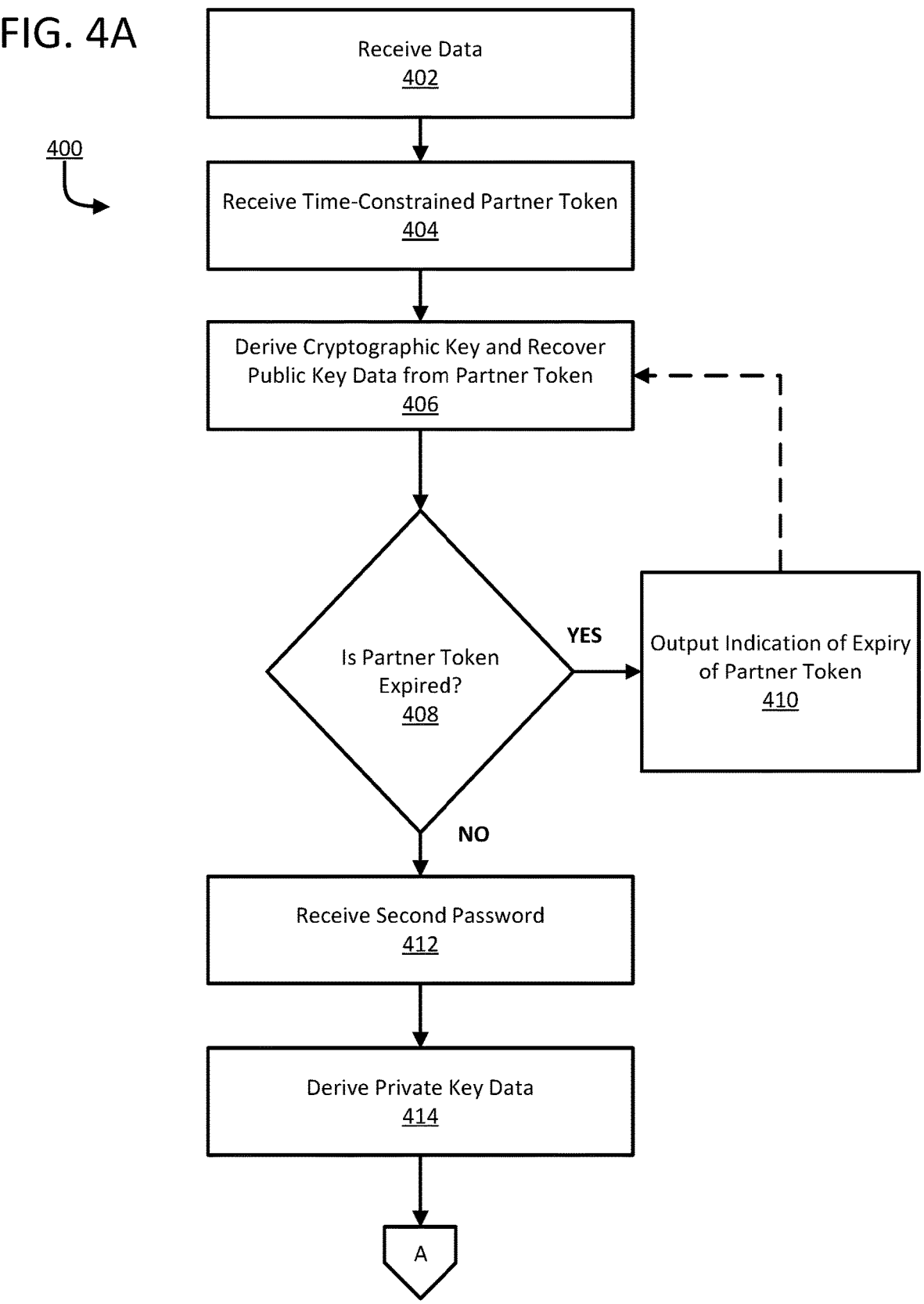
FIGS. 4A and 4B show an example of a process for using a partner token generated in accordance with the process of FIGS. 3A and 3B for encrypting sensitive data according to one or more aspects of the disclosure.
Figure 4B:
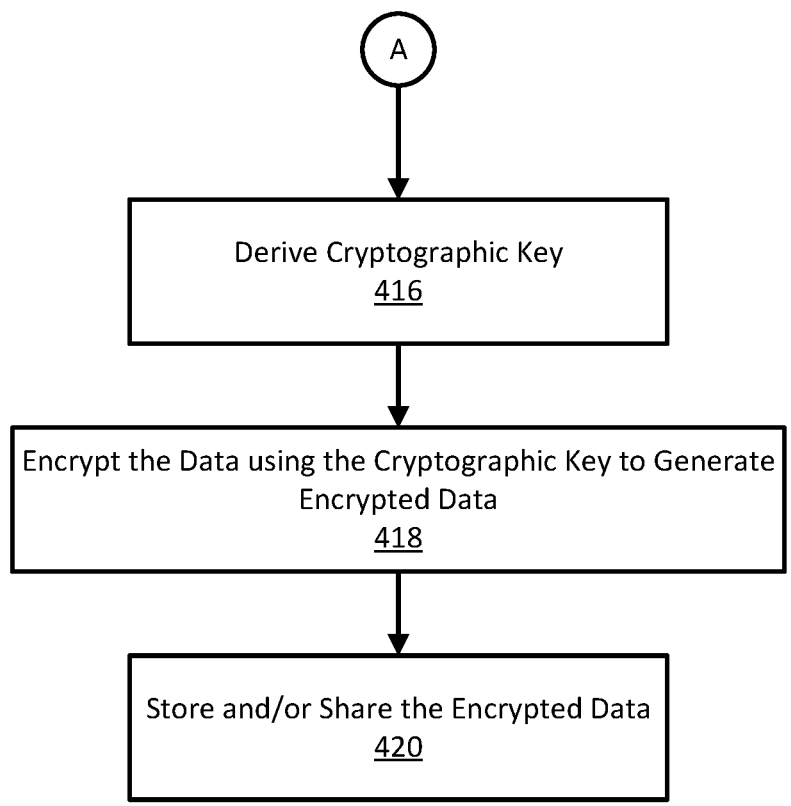

FIGS. 4A and 4B show a flow chart of a process 400 for using a token to encrypt data (e.g., sensitive data) according to one or more aspects of the disclosure. The token used to encrypt data in the process 400 may be a token generated according to the process 300 (e.g., the token 108). The process 400 may represent a portion of a process for protecting data using two password asymmetric encryption according to one or more aspects of the disclosure. For example, the process 400 may represent a process by which a second computing device (e.g., the second computing device 104 of FIG. 1) uses a token (e.g., the token 108) generated by a first computing device (e.g., the first computing device 102 of FIG. 1) to derive a second cryptographic key that is used to encrypt data.

Some or all of the steps of process 400 may be performed using one or more computing devices (e.g., an application executing on a computing device) as described herein, including, for example, a client device, a server, or a memory and a processor configured to perform the methods described herein. For example, any portion of the process may be performed using the first computing device 102 of FIG. 1, the second computing device 104 of FIG. 1, or the computing device 200 of FIG. 2.

In step 402, the second computing device may receive data to be encrypted. The data may comprise any type of data and may comprise sensitive data (e.g., a confidential document, personal information, etc.). The data may be stored in a memory associated with and/or accessible by the second computing device. The data may be data provided by a second user (e.g., inputted by the second user—"Bob") associated with the second computing device. In one example, the second computing device may be associated with a second user, "Bob," and the data received by the second computing device may be "Hello, World!"

In step 404, the second computing device may receive a time-constraint token from the first computing device. The time-constraint token may be a time-constraint token generated by the process 300 by the first computing device (e.g., the token 108 generated by the first computing device 102).

In step 406, the second computing device may derive and use the first cryptographic key to decrypt the time-constraint token to recover the first public key. The first cryptographic key may be the same cryptographic key as the first cryptographic key derived by the first computing device in step 314, and may be derived in the same or substantially the same manner. The recovered first public key may be the first public key derived by the first computing device in step 306.

As described herein, the time-constraint token received in step 404 may include embedded and encrypted public key data. The public key data may be considered to be partner public key data (or a partner public key) as the public key data may be generated by a partner computing device (e.g., generated by the first computing device 102 by the associated user Bob). As an example, the process 400 may recover the first public key embedded in the time-constraint token generated by a partner computing device. Further, the process 400 may decrypt the time-constraint token using the same cryptographic key used to encrypt the data embedded within the time-constraint token (e.g., first cryptographic key/first symmetric key).

The second computing device may derive the first cryptographic key in step 406 in the same manner that the first computing device derives the first cryptographic key in step 314—for example, the second computing device may implement the same or substantially the same steps as steps 312 and/or 314.

In particular, in step 406, the second computing device may receive the predetermined shared secret, a second current system time (e.g., a system time later in time that the current system time received by the first computing device in accordance with any delay in sending the time-constraint token to the second computing device), and the cryptographic parameters. The predetermined shared secret and the cryptographic parameters used by the second computing device to derive the cryptographic key may exactly match the predetermined shared secret and the cryptographic parameters received by the first computing device to derive the first cryptographic key in step 312.

The second current system time may also be determined in a manner similar to a manner that the first current system time is determined. In one example, the current time when the first computing device receives the current system time may be "2022-03-08 12:56:50," such that the current system time, "t," may be "27446036," which may represent a number of minutes from epoch. The current time may advance to a later time when the second computing device receives and uses the token from the first computing derive. As an example, the current time may advance to a later time such that the current time (e.g., a second current time) may be "2022-03-08 12:56:55," meaning that the second current time is 5 seconds later from the first current time. The second current system time may be derived using an epoch converter based on the second current time and may be determined to be a second current system time, "t2", which may be: "27446036" (e.g., minutes from epoch). Under such a scenario (e.g., advancement of the current time by only 5 seconds), the current system time and the second current system time may match (e.g., t2 may be determined to be equal to t), as a determination of any current system time may be based on a number of minutes from epoch (e.g., such that any time difference of less than 60 seconds may result in a same value for an initial current system time and a later current system time determined from an epoch converter).

A system (e.g., the first computing device 102 and/or the second computing device 104) implementing the protection of data using two password asymmetric encryption as described herein may allow tokens to be valid for any period of time. In one example, tokens may be valid for 1 minute. The amount of time a token has existed may be determined by determining the current system time as described herein. Continuing with the example described above, the current time when the second computing device derives the first cryptographic key may be 5 seconds later from when the first computing device derives the first cryptographic key. As a result, the current system time determined by the first computing device may be "27446036" (e.g., represented by "t"), which may match the second current system time determined by the second computing device may be "27446036" (e.g., represented by "t2").

Further, the key derivation algorithm or protocol for deriving the cryptographic key by the second computing device in step 406 may match the key derivation algorithm or protocol used by the first computing device in step 314. Further, all other inputs to the key derivation algorithm or protocol for deriving the first cryptographic key by the second computing device in step 406 may match those inputs to the key derivation algorithm or protocol for deriving the first cryptographic key by the first computing device in step 314. In this manner, the first cryptographic keys derived in step 314 and step 406 may be the same (e.g., as intended).

As will be appreciated based on the discussion herein, a variable input to a key derivation process that generates the first cryptographic key in either step 314 or step 406 may be the current system time. As discussed herein, the current system time may be determined using an epoch converter in view of a determined validity period of the token. For example, if the validity period is 3 minutes, then the current system time determined by both the first and second computing devices may match, provided the actual time between determining the respective current system times is less than 3 minutes.

In one example, the AES encryption key (e.g., the cryptographic key derived in step 314) may be derived by the second computing device in step 406 using the same key derivation algorithm (e.g., PB KDF2), using the same cryptographic parameters (e.g., specified number of iterations and/or a hash algorithm), using the same predetermined shared secret (e.g., "secretSECRET"), and using the same current system time (e.g., based on the second current system time being derived to have the same value of "27446036," such that t=t2). Under such a scenario, the cryptographic key may be derived to be the same as the cryptographic key from step 314 as:
"9c449a32a366d25f31b937861af813e208a74f17130719 8131e2f640ee215671".

Based on the derived cryptographic key, the token may then be decrypted to recover the following first public key data from the first computing device (e.g., Alice) to be:
"040031a892095b54288d21336291be0e993a2c28de1e9 eeaba177195530346b2646 2b21e06cc696072b7ee93 714a75b7cc84a9461cd5b229c3acdf6103423696a443e 80 0520bd7cfa4bd5a2d76434043e5f8b12533b69ab 2cfe0e0df283c97eb2b3f4db54678 bd9560af21c6 a23e3ed3a6d2ab4ddb82b3e1657614eb51701518975b9 6f0f", which may match the first public key data generated in step 306.

The token may also be decrypted to recover an embedded checksum or error correction data of: "7fe577b0644f64e06a8a5a730bc9da33e1e2bf8c", as in step 310 of the process 300 the first public key data and error checksum data may be combined prior to encryption in step 316.

Also, in step 318, the output of the encryption step 316 may be encoded. As such, prior to decrypting the partner token, in step 406 the partner token may be first decoded. As an example, the partner token may be decoded from one base to another base, such as from base 64 to an original base of the output data of the encryption step 316.

In step 408, the second computing device may determine, based on the recovered public key, whether the first time-constraint token is valid. As will be appreciated based on the discussion herein, and in particular in view of step 310, the recovered first public key data is combined with error detection data generated in step 308. A manner of combining the first public key data and the error correction data may be known to the second computing device, such that in decrypting the token in step 406, the second computing device may separate the recovered decrypted data into a recovered first public key portion and a recovered error detection data portion (e.g., parse or decouple the recovered first public key and the recovered error detection data).

The second computing device may perform an error detection calculation on the recovered first public key data to generate second error detection data. The second computing device may perform the same error detection calculation as performed in step 308. Specifically, in one example, the second computing device may perform an error detection calculation on the recovered first public key data based on SHA-1 to generate second error detection data. Further, in step 408, the second computing device may compare the recovered error detection data from step 406 to the second error detection data generated in step 408.

If the recovered error detection data matches the second error detection data, then the process 400 may continue to step 412, described further herein. If the recovered error detection data does not match the second error detection data, then the process 400 may continue to step 410. The comparison between the recovered error detection data and the generated second error detection data may be used by the second computing device to determine if the received time-constraint token is valid.

In one example, the recovered error detection data may be:
"7fe577b0644f64e06a8a5 a730bc9da33e1e2bf8c" (e.g., matching the error detection data generated in step 308, which may be determine as part of the step 406). Further, the second computing device may perform the SHA-1 error detection calculation on the recovered first public key data described above to generate second error detection data: "7fe577b0644f64e06a8a5a730bc9da33e1e2bf8c". As can be seen with this particular example, the value of the recovered error detection data matches the value of the generated second error detection data. Accordingly, the recovered checksum matches the calculated checksum. As a result, the second computing device may determine that the time-constraint token is valid, and may proceed to step 412.

In step 410, it may be determined that the recovered first public key data is not correct, based on the recovered error detection data not matching the generated second error detection data. As a result, the second computing device may determine that the recovered first public key data will not match the first public key data generated in step 306.

As will be appreciated based on the discussion herein, the recovered first public key data will not match the first public key data generated in step 306 if any of the inputs into the key derivation process for generating the cryptographic key in step 406 do not match the inputs into the derivation process for generating the first cryptographic key in step 314. All of the inputs to each derivation process may be the same or static (e.g., the predetermined shared secret, the number of specified interactions, etc.) other than the current system time, which may vary based on the current time and operation of an epoch converter to derive the current system time from the current time as described herein.

As such, the current system time may be a variable input into each key derivation process in steps 314 and 406, allowing the tokens generated as described herein to have a time-sensitive or time-dependent component. That is, if the current system time is outside of a valid period of the token, the public key data recovered in step 406 will not match the public key data from step 306, and so the token cannot be used to encrypt or decrypt data. This provides an enhanced layer of security by ensuring that a token may only be used for a limited period of time, further enhancing the data security techniques described herein.

As mentioned above, in step 410 it may be determined that the token is expired (e.g., by determining that the embedded checksum of the partner token does not match the checksum calculated on the recovered first public key data from the partner token). As such, the second computing device may output an indication to a user (e.g., Bob) that the token is expired.

Additionally or alternatively, the second computing device may allow one or more retry attempts to recover the correct first public key data. As an example, it may be agreed that if the token is determined to be expired in step 410, then the second computing device may be permitted to move the determined current system time back by 1 minute (shown by the phantom line in FIG. 4A), and may be permitted to re-derive the first cryptographic key in step 406, and to then determine if the first public key data may be properly recovered (e.g., by repeating step 408). By allowing the second current system time to be moved back by 1 minute, tokens which have expired for less than one minute may still be used to recover the public key data.

In a first example, the current time used by the first computing device may be "2022-03-08 12:56:50," such that the determined current system time may be: "t=27446036." If the second current time when the second computing device decrypts the token is "2022-03-08 12:56:55" (5 seconds later), then the determined second current time may also be: "t2=27446036." As explained herein, since the second current system time matches the current system time, the first public key data will be properly recovered.

In a second example, if the second current time when the second computing device decrypts the token is "2022-03-08 12:57:59" (1 minute and 9 seconds later), then the determined second current system time may be: "t2=27446037." As explained herein, since the second current system time does not match the current system time, the first public key data will not be properly recovered (e.g., in step 408, the recovered error detection data will not match the generated second error detection data). As a result, the second computing device may determine the token is expired.

Further to this second example, it may be agreed between the first and second computing devices to allow the second computing device, if the token is determined to be expired, to modify (e.g., back up) the second current system time by 1 minute, thereby changing the value from "27446037" to "27446036." In doing so, the process of deriving the first cryptographic key may be repeated (e.g., step 406 may be repeated based on the modified second current system time) and the first public key data may be recovered. Under this scenario, the first public key data using the adjusted or modified second current system time (e.g., backed up by 1 minute) may match the first public key data of step 306 as desired.

In a third example, if the second current time when the second computing device decrypts the token is "2022-03-08 12:59:59" (3 minutes and 9 seconds later), then the determined second current system time may be: "27446039." As explained herein, since the second current system time does not match the current system time, the first public key data will not be properly recovered. As a result, the second computing device may again determine the token is expired. Under this example, even if the second computing device is allowed to modify the second current system by backing it up by 1 minute (e.g., changing "t2=27446039" to "t2=27446038), the retry process will not result in the proper first public key data being recovered, as the first cryptographic key rederived in this manner will not match the first cryptographic key from step 314 (e.g., because the variable input into the key derivation process—the current system time—will not be the same in steps 312 and 406, thereby preventing the recovered error detection data from matching the second generated error detection data).

In this manner, a validity period of the token may be enforced while allowing for minor delays between generating a token via process 300 and using the token via process 400 (e.g., to account for unexpected but allowable delays). Further, longer delays or extended periods of time between generation and use that are outside of the validity period of the token may prevent the token from being used (e.g., as explained in relation to the third example above). This enhances the security of the techniques described herein as a malicious actor that is able to gain access to a partner token is likely unable to use it within the partner token validity period to be able to properly recover sensitive data.

As described herein, any number of retries, any validity period, and any change to the current system time may be used (e.g., any values) and agreed upon. Further, determination of whether the partner token is valid in step 408 (e.g., whether the first public key data recovered is correct and/or matches first public key data from step 306) may be based on comparing the embedded checksum of the partner token to a checksum based on the recovered partner key data. If the embedded checksum and calculated checksum match, then the partner token may be considered valid and the recovered first public key data may be considered valid. If the embedded checksum and calculated checksum do not match, then the partner token may be considered invalid (e.g., expired) and the recovered public key data may be considered invalid (e.g., incorrect).

In step 412, after determining that that token is valid and recovering the first public key data, the second computing device may receive a second password. The second password may be associated with the second user ("Bob") and/or may be associated with the second computing device. The second password may comprise any type of data or information, including an alphanumeric password, biometric information, etc. The second password may be stored in a memory associated with and/or accessible by the second computing device. The second password may be data provided by the second user (e.g., inputted by the second user). In one example, the second password may be "BobPassword."

In step 414, the second computing device may derive a second asymmetric key pair, including second public key data (e.g., a second public key) and private key data (e.g., a second private key) based on the second password. To derive the second private key based on the second password, the second computing device may implement steps corresponding to steps 304 and 306. In particular, in step 414, the second computing device may implement steps corresponding to steps 304 and 306 to generate second private key data and second public key data. In contrast to the results of steps 304 and 306, however, the derived second public key data may be discarded, and the second private key data may be retained.

As an example, the second computing device may derive the second private key data by deriving a second block of data of a second desired size using the same key derivation function of step 304 (e.g., PBKDF2) and based on the second password. The second user, "Bob" may provide his password, "BobPassword," to the second computing device in step 412. In step 414, the second block of data may be derived using the PBKDF2 key derivation function, with a number of iterations specified to be "4096," the cryptographic salt specified to be "saltSALT," and the password specified to be the "BobPassword" (e.g., the second password), and the hashing algorithm specified to be SHA25. Under such a scenario, all of the inputs to the PBKDF2 derivation function may match those inputs to the PBKDF2 derivation function of step 304, other than the input passwords. As such, the second block of data may be derived to be:

"2ba7d88b8cfa64d00059ad41edb3ce80203bffad935379f 211eb85167dad817ed1ed 5d6bdc9a6f16d2d36 d77c24dcc0c1c079216e44cb4040983c7f10537d3c78 a041129f 3b174c118".

Next, the second public key data (e.g., a second public key) and the second private key data (e.g., the second private key) may be derived using a second key derivation function and based on the second block of data of the second desired size. The second key derivation function may match the key derivation function of step 306. In one example, the second key derivation function may be the ECDH P-521 protocol and the second block of data may be as shown in the example discussed above. As a result, a second public key may be derived to be:

"0400919cc7c369351edbb7c04700354aaae3f4334475c4 b3342d2888ecf4204c8ec0 36dadf0aea70e58650d13f 39960922a6d348c9632fb2bb32482766c4b03d9d1ffb0 10 27226ca982c5b9f5dbd8464b5dab315b359e2a840 a4839deaa383a81e170ce163c32 d3581df615fb57d0 d2df23ecc359b60c13db737f2224617d436f0950daa2c", which may be discarded, and a second private key may be derived to be:

"59ad41edb3ce80203bffad935379f211eb85167dad817ed 269616f4183b2e3632a86d048312dbde9fac2727df531 7eb5f364d46fb304bff7c3a9f11ca71a8dd9" which may be retained. The second private key data derived in step 414 and the second public key data derived in step 306 may form a second asymmetric key pair.

In step 416, the second computing device may derive a second cryptographic key (e.g., a second symmetric key). The second cryptographic key may be derived based on the recovered first public key (from step 406) and based on the second private key generated in step 414. The recovered first public key from step 406 may be considered to be a partner public key or partner public key data. The second cryptographic key may be derived based on any key derivation algorithm or protocol. As an example, the key derivation protocol may be EDCH P-521. Further, the inputs to the EDCH P-521 key derivation protocol may include the recovered first public key (from step 406) and the second private key generated in step 414.

In one example, based on the values for these private and public keys provided in the above examples, the second cryptographic key may be derived to be:

"99ec2f725a296089f057a6c1616449e82b68f7effdb0492 3527cd82b8f888100". The cryptographic key may be considered to be a data encryption key.

In step 418, the second computing device may encrypt the data received in step 402 based on the second cryptographic key derived in step 416 to generate encrypted data. As part of step 418, the second computing device may perform an error detection calculation on the data prior to encrypting the data. For example, the second computing device may perform an SHA-1 based error detection calculation on the data to generate error detection data (e.g., a checksum or checksum data). The checksum data may be combined with the raw data (e.g., "Hello, World!") prior to being encrypted. The data and generated checksum may be combined in any manner, such as by concatenating the data and generated checksum or by interleaving the data and generated checksum, as described herein.

In one example, the data is "Hello, World!" and the SHA-1 error detection calculation is performed on this data to generate checksum data of "0a0a9f2a6772942557ab5355d76af442f8f65e01". The sensitive data and checksum data may then be concatenated (e.g., the checksum data may be appended to the data) and then encrypted using the key value described above to form encrypted data (e.g., using the data encryption key derived in step 416).

The encrypted data may be encoded after encryption. Any type of encoding may be used. In one example, the encrypted data—comprising the combined data and checksum data (e.g., combined by concatenating)—is encoded to Base64 to form a Base 64 string of encrypted and encoded data of:

"0Sk2fnLNvExNs3AFNNY9KR6jZ1P1LsOMPAcD0w QDncW3BZ9Ln3fM-ZpN5KEO0gzdXA==". This data may be considered to be ciphertext, or an output of the encrypting process performed by process 400.

In step 420, the ciphertext may be stored by the second computing device. Additionally or alternatively, the ciphertext may be shared by the second computing device. As an example, the ciphertext generated in step 418 may be transmitted by the second computing device to the first computing device.

The steps of process 400 may be performed in any suitable order, and any step may be combined with another other step of process 400.

As will be appreciated based on the discussion provided herein, the process 400 enables a computing device to use a time-constraint token that may be provided by a partner computing device to encrypt data. As described herein, the process 400 provides for a data encryption key to be derived based on public key data that may be encrypted and embedded within the time-constraint token, and based on private key data generated by a computing device using the token to encrypt data. As the token is time-constrained, it may be restricted to being used to encrypt data for a certain amount of time (e.g., a validity period, or a period of time during which the token is not expired). The time-constrained nature of the token enhances security by limiting the range of time over which data may be encrypted using the token. In this manner, a compromised token (e.g., a token stolen or intercepted by a malicious actor) may not be used to encrypt or decrypt data outside of the validity period of the token. As such, tight control over the security of the sensitive data may be maintained.

Having discussed use of a token to encrypt data with respect to FIGS. 4A and 4B, discussion will now turn to use of a token to decrypt data.

Figure 5A:
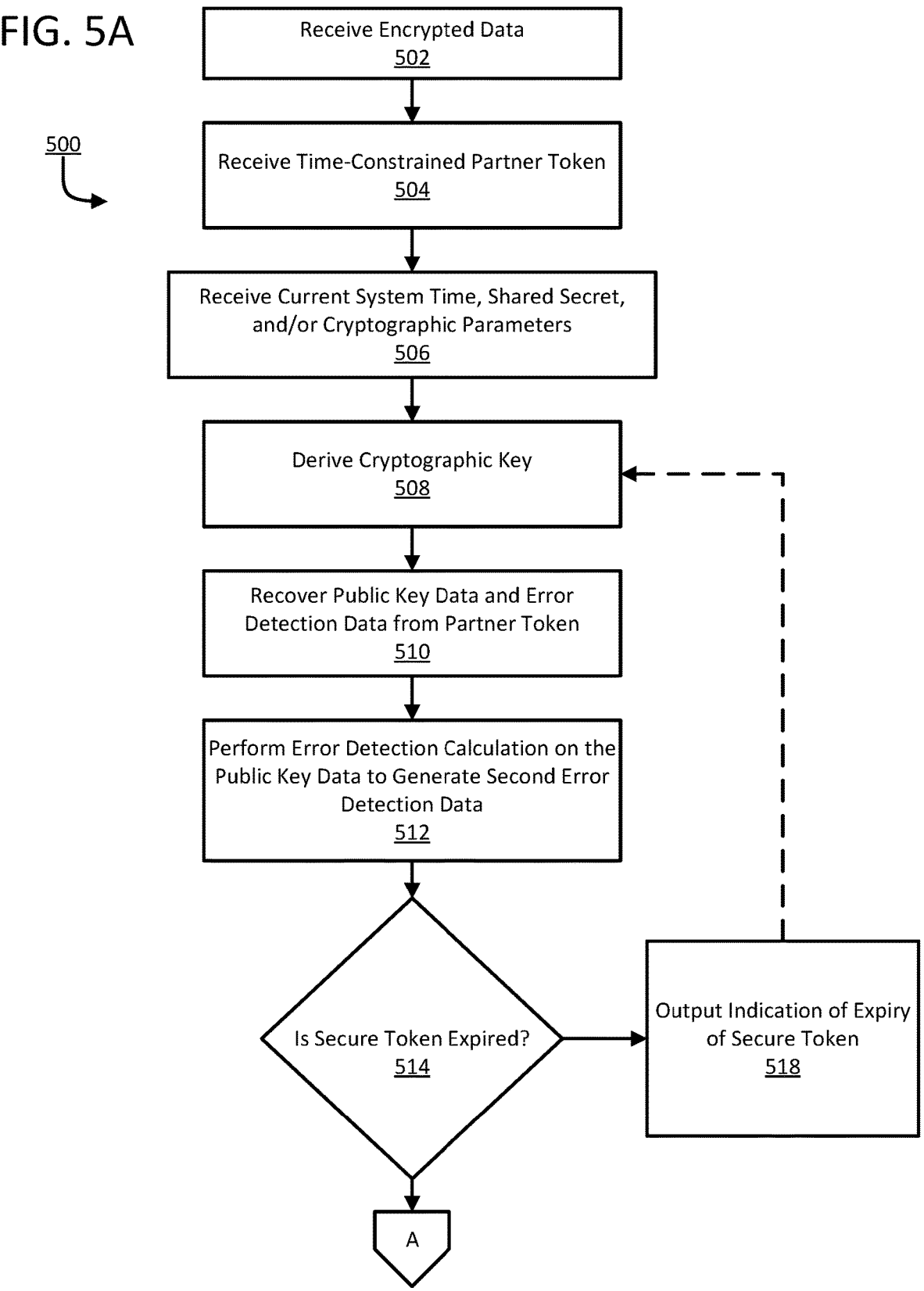
FIGS. 5A and 5B show an example of a process for using a partner token generated in accordance with the process of FIGS. 3A and 3B for decrypting encrypted data according to one or more aspects of the disclosure.
Figure 5B:
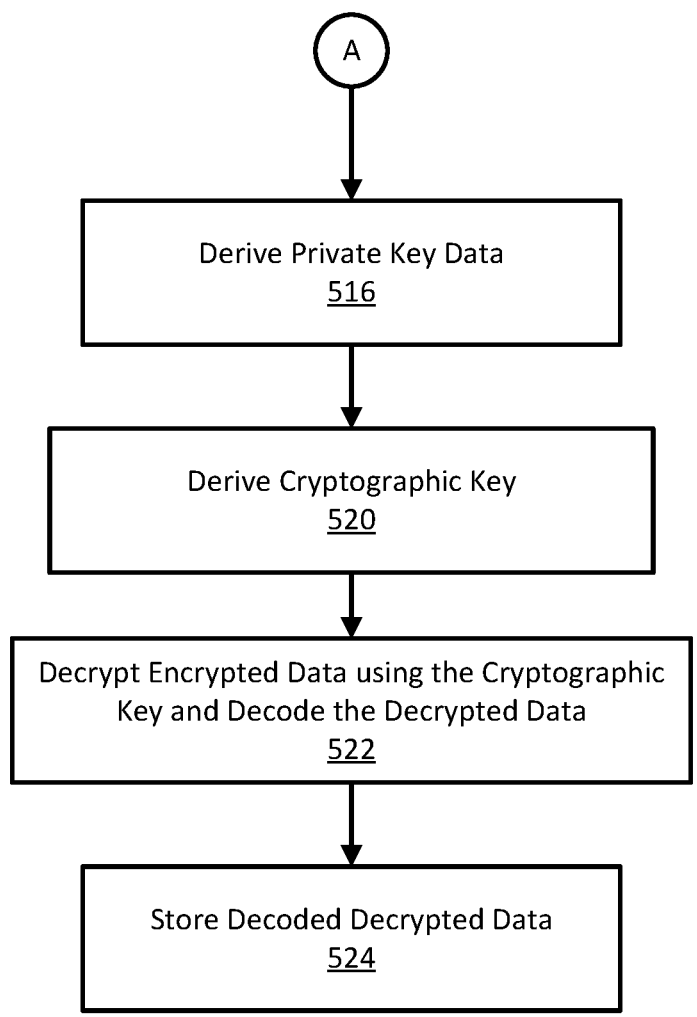

FIGS. 5A and 5B show a flow chart of a process 500 for using a token to decrypt data (e.g., sensitive data) according to one or more aspects of the disclosure. The token used to decrypt data in the process 500 may be a token generated according to the process 300 (e.g., the token 110). The process 500 may represent a portion of a process for protecting data using two password asymmetric encryption according to one or more aspects of the disclosure. For example, the process 500 may represent a process by which a first computing device (e.g., the first computing device 102 of FIG. 1) uses a token (e.g., the token 110) generated by a second computing device (e.g., the second computing device 104 of FIG. 1) to decrypt data.

Some or all of the steps of process 500 may be performed using one or more computing devices (e.g., an application executing on a computing device) as described herein, including, for example, a client device, a server, or a memory and a processor configured to perform the methods described herein. For example, any portion of the process may be performed using the first computing device 102 of FIG. 1, the second computing device 104 of FIG. 1, or the computing device 200 of FIG. 2.

The process 500 will be described in relation to an example whereby a first computing device (e.g., the first computing device 102 associated with a first user, Alice) is used to decrypt protected data with a password (e.g., the first password as described herein) associated with the first computing device.

In one example, Alice may wish to use a first computing device (e.g., the first computing device 102) to decrypt data that was encrypted by a second computing device (e.g., the second computing device 104 associated with a second user, Bob). The data may have been encrypted by the second computing device at a time: "2022-03-08 12:56:50." It may be desired to decrypt the data using the first computing device at a time 90 days later after the data was encrypted, at a time: "2022-06-06 12:56:30." In particular, the data "Hello, World!" may have been encrypted by the second computing device to generate ciphertext:

"0Sk2fnLNvExNs3AFNNY9KR6jZ1P1LsOMPAcD0w QDncW3BZ9Ln3fM-ZpN5KEO0gzdXA==" (e.g., as described in relation to step 418 of the process 400).

To decrypt the ciphertext, the second computing device may generate a token using the process 300. The token may be generated by the second computing device at a time: "2022-06-06 12:56:10." The token may be valid for a time from: "2022-06-06 12:56:00" to "2022-06-06 12:57:59." The token may be provided from the second computing device to the first computing device. The token may be:

"fzxKbaLimUwP9rCrf5s0HkwEIm4ZuUB6KYb-QMA4JXMqey0xhDr1vK1gccCBUTkVbueR-gIAFJgSdtHMW7bGyVOrzjkrZ8vKjVbQr6rBZn-eSGNcPnC4bHh97EzVLjM2pg4iNBFeRqhFSCA5V YzcOVytzctquuwNmlFgPJb VTgVfYMFdk0Apz894 OtxA6m9UZfjjhpD6rNKjFwRlzkOwYlbjKAOlE jmzA==".

The first computing device may use this token, and a password associated with the first computing device, to decrypt the data. The encrypted data may be stored or otherwise accessible to the first computing device.

With this example as an illustrative backdrop, the process 500 will now be described in more detail.

In step 502, the first computing device may receive the encrypted data. The encrypted data may be transmitted or sent to the first computing device. The encrypted data may be stored or otherwise accessible to the first computing device. The encrypted data may be considered to be ciphertext and may have the value as shown in the example described above. The encrypted data may be the data encrypted by the process 400.

In step 504, the first computing device may receive a token. The token may be generated by the second computing device. The token may be a token different from a token used to encrypt the data. As such, the token may be considered to be a second time-constraint partner token. The token may be a token generated by the process 300.

As part of receiving the partner token, the partner token may be decoded. As noted with respect to step 318, the encrypted data output from step 316 may be encoded in any manner (e.g., encoded based on Base64). Accordingly, in step 504, the received partner token may be decoded in a corresponding manner (e.g., converted from a first base to a second base, for example from Base64 encoding to an original base).

In step 506, the first computing device may receive parameters to generate a first cryptographic key (e.g., a first symmetric key). The parameters may include the current system time, the predetermined shared secret associated with the first computing device and the second computing device, and the cryptographic parameters, as described herein (e.g., in relation to steps 312 and 406).

In one example, the cryptographic parameters may specify a desired number of iterations and may specify "4096" iterations. As mentioned above, the time when it is desired to decrypt the data may be: "2022-06-06 12:56:30." As such, a current system time may be determined to be: "27575636" (e.g., t3, or 90 days after the data was encrypted by the process 400).

In step 510, the first computing device may derive the first cryptographic key using a key derivation function, and/or based on the current system time, the predetermined shared secret, and/or the cryptographic parameters received in step 508. The key derivation function may be the same key derivation function used in step 314.

In one example, the key derivation function may be the PBKDF2 key derivation function, and may be based on the same predetermined shared secret (e.g., "SharedSecret"), same number of iterations (e.g., "4096"), same cryptographic salt (e.g., current system time, or t3=27575636), and hash algorithm, (e.g., SHA 256), corresponding to the parameters used in steps 312 for generating the token. As a result, a decryption key (e.g., AES key) may be derived to be: "4985d4c6da04087e45b3b3d92c548404a8f1 a33106e4a692a1dd7f76b76c6249".

In step 510, the token received in step 504 is decrypted using the first cryptographic key (e.g. the first symmetric key) derived in step 508. As a result of decrypting the token, public key data and error detection data of the token may be recovered. In particular, the token may be decrypted to provide decrypted data. The decrypted data may include a first portion of data and a second portion of data. The first portion of data may be public key data and may be:

"0400919cc7c369351edbb7c04700354aaae3f4334475c4 b3342d2888ecf4204c8ec0 36dadf0aea70e58650 d13f39960922a6d348c9632fb2bb32482766c4b03d9d1 ffb010 27226ca982c5b9f5dbd8464b5dab315b359e 2a840a4839deaa383a81e170ce163c32 d3581df61 5fb57d0d2df23ecc359b60c13db737f2224617d436f09 50daa2c". The second portion of the data may be embedded checksum data and may be: "0a21bf94332304d9fd88c2133bb7ffbcf9dc238f".

The decrypted data may include the first and second portions of data based on combining the public key data (e.g., derived in step 306) with the error detection data (e.g., generated in step 308), as described in step 310. The first computing device may know or otherwise be aware of how the second computing device combined the public key data and error detection data in step 310 so as to decouple the two portions of data as described above.

In step 512, an error detection calculation on the recovered public key data may be performed to generate second error detection data. The error detection calculation may be based on SHA-1 and the resulting second error detection data may be considered to be a checksum. In one example, performing an error detection calculation on the public key data shown in the example described above and based on SHA-1 yields: "0a21bf94332304d9fd88c2133bb7ffbcf9dc238f".

In step 514, a determination as to a validity of the token may be performed. In particular, a comparison between the second error detection data generated in step 512 may be compared to the recovered error detection data from step 510. If the second error detection data generated in step 512 matches the recovered error detection data from step 510, then the first computing device may determine that the token is valid and unexpired. As such, the process may proceed to step 516.

If the second error detection data generated in step 512 does not match the recovered error detection data from step 510, then the first computing device may determine that the token is not valid or is expired. As such, the process may proceed to step 518.

In step 518, the first computing device may output an indication (e.g., to the first user Alice) that the token is not usable or is invalid. In one example, the process 500 may end with step 518. Alternatively, as similarly described in relation to step 410 of the process 400, the first computing device may be permitted to adjust the current system time (e.g., modify the current system time) and to re-derive the data decryption key.

For example, the first computing device may be allowed to adjust the current system time (e.g., to reduce it by 1 minute) and may be allowed to re-derive the decryption key in step 510 (e.g., shown in FIGS. 5A and 5B by the line in phantom). In this manner, steps 508, 510, 512, and 514 may be repeated. As discussed above in relation to step 410, the first computing device may be allowed a certain number of retry attempts (e.g., modifications of the current system time it initially receives in step 508) and may be allowed to reduce the current system time by a certain amount or value (e.g., may be allowed to back up the current system time by 1 minute only once for one retry attempt).

As described above, the first computing device may proceed to step 516 when it is determined that the token is valid and/or unexpired. In step 516, the first computing device may derive private key data (e.g., a private key) based on a first password (e.g., "AlicePassword"). To derive the private key based on the first password, the first computing device may implement steps corresponding to steps 304 and 306. In particular, in step 516, the first computing device may implement steps corresponding to steps 304 and 306 to generate private key data and public key data. In contrast to the results of steps 304 and 306, however, the derived public key data may be discarded, and the private key data may be retained.

As an example, the first computing device may derive the private key data by deriving a block of data of a desired size using the same key derivation function of step 304 (e.g., PBKDF2) and based on the first password. The first user, "Alice" may provide her password, "AlicePassword," to the first computing device. The block of data may be derived using the PBKDF2 key derivation function, with a number of iterations specified to be "4096," the cryptographic salt specified to be "saltSALT," and the password specified to be the "AlicePassword" (e.g., the first password), and a hashing algorithm specified to be SHA25. Under such a scenario, all of the inputs to the PBKDF2 derivation function may match those inputs to the PBKDF2 derivation function of step 304, other than the input passwords. As such, the block of data may be derived to be:

"ec77903507dc0c34f59d48da06b40f2ea62b1c40192cbae
d838787fdad914aa5fa03 52e0e6552682140adc18da
8c4e2eed84f89bfda1ad5cf092617900d230a69a47a63
3e ce1d19a71".

Next, the public key data (e.g., a public key) and the private key data (e.g., the private key) may be derived using a second key derivation function and based on the block of data of the desired size. The second key derivation function may match the key derivation function of step 306.

In one example, the second key derivation function may be the ECDH P-521 protocol and the block of data may be as shown in the example discussed above. As a result, a public key may be derived to be:

"040031
a892095b54288d21336291be0e993a2c28de1e9eeaba1
77195530346b2646 2b21e06cc696072b7ee93714a
75b7cc84a9461cd5b229c3acdf6103423696a443e80
0520bd7cfa4bd5a2d76434043e5f8b12533b69ab2cfe
0e0df283c97eb2b3f4db54678 1bd9560af21c6a23e
3ed3a6d2ab4ddb82b3e1657614eb51701518975b96
f0f", which may be discarded, and a private key may be derived to be:

"f59d48da06b40f2ea62b1c40192cbaed838787fdad914aa
5fca3128553ebb1524864 ac6768e033aaa266f0164bf
7a5b2da25ab45ba84e2e93c318f9cfdb84f41a2", which may be retained.

In step 520, the first computing device may derive a cryptographic key. The cryptographic key may be derived based on the recovered public key (from step 510) and based on the private key generated in step 516. The recovered public key from step 510 may be considered to be a partner public key or partner public key data. The cryptographic key may be derived based on any key derivation algorithm or protocol. As an example, the key derivation protocol may be EDCH P-521. Further, the inputs to the EDCH P-521 key derivation protocol may be the recovered public key (from step 510) and the private key generated in step 516. In one example, based on the values for these private and public keys provided in the above examples, the cryptographic key may be derived to be:

"99ec2f725a296089f057a6c1616449e82b68f7effdb0492
3527cd82b8f888100".

In step 522, the first computing device may decrypt the data received in step 502 (e.g., the ciphertext output by the process 400) based on the cryptographic key derived in step 516. The decrypted data may include a first portion of data and a second portion of data. The first and second portions of data may result based on step 418, whereby data to be encrypted is combined with checksum data. As a result, the first portion of data may be plaintext and the second portion of data may be an embedded checksum (e.g., recovered error detection data).

To verify that the recovered plaintext is correct, the first computing device may perform an error detection calculation on the plaintext. For example, the first computing device may perform an SHA-1 based error detection calculation on the plaintext to generate error detection data (e.g., a checksum or checksum data).

In one example, the recovered plaintext may be determined to be: "48656c6c6f2c20576f726c6421", based on decrypting the encrypted data (e.g., ciphertext: "0Sk2fnLNvExNs3AFNNY9KR6jZ1P1LsOMPAcD0w QDncW3BZ9Ln3fM-ZpN5KEO0gzdXA="), using the cryptographic key described above. The SHA-1 error detection calculation may be performed on the recovered plaintext to generate checksum data of "0a0a9f2a6772942557ab5355d76af442f8f65e01."

This generated checksum data matches the checksum data recovered from the encrypted data in step 520.

If the generated checksum data does not match the recovered checksum data, then the first computing device may provide an indication to that effect. For example, the first computing device may output an indication that the ciphertext is invalid and/or that the encrypted data may not be decrypted properly.

In step 522, the first computing device may also decode the recovered plaintext to a plaintext string. As an example, the first computing device may convert the plaintext, which may be encoded using Base 64 encoding or hexadecimal encoding, to plain text (e.g., an alphanumeric string). In one example, the plaintext of: "48656c6c6f2c20576f726c6421" may be decoded to the string of: "Hello, World!" Further, based on the results of step 520, the first computing device may output an indication that this resulting recovered plaintext string is correct and valid.

In step 524, the first computing device may store the recovered data string. Additionally or alternatively, the recovered data string may be used (e.g., consumed) by the first computing device.

The steps of process 500 may be performed in any suitable order, and any step may be combined with another other step of process 500.

As will be appreciated based on the discussion provided herein, the process 500 enables a computing device to use a time-constraint token that may be provided by a partner computing device to decrypt data. As described herein, the process 500 provides for a data decryption key to be derived based on public key data that may be encrypted and embedded within the time-constraint token, and based on private key data generated by a computing device using the token to decrypt data. As the token is time-constrained, it may be restricted to being used to decrypt data for a certain amount of time (e.g., a validity period, or a period of time during which the token is not expired). The time-constrained nature of the token enhances security by limiting the range of time over which data may be decrypted using the token. In this manner, a compromised token (e.g., a token stolen or intercepted by a malicious actor) may not be used to decrypt data outside of the validity period of the token. As such, tight control over the security of the sensitive data may be maintained.

As will be appreciated based on the discussion herein, encryption of data (e.g., via the process 400) may fail if an expired token is used. Decryption of encrypted data (e.g., via the process 500) may also fail if an expired token is used. Decryption of encrypted data (e.g., via the process 500) may also fail if a token from another source is used—for example, a token from a computing device that is not a partner computing device. Additionally, decryption of encrypted data (e.g., via the process 500) may also fail if corrupted or erroneous encrypted data or partner token data is used.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner Thus, the present disclosure should be considered in all respects as illustrative and not restrictive. Accordingly, the scope of the disclosure should be determined not by the examples, but by the appended claims and their equivalents.

What is claimed is:

1. A method comprising:
   receiving, at a first computing device, data to be encrypted;
   receiving, at the first computing device and from a second computing device, a first time-constraint token;
   receiving, at the first computing device, a current system time and a predetermined shared secret associated with the first computing device and the second computing device;
   deriving, using a first key derivation function and based on the current system time and the predetermined shared secret, a first cryptographic key;
   decrypting, by the first computing device and using the first cryptographic key, the first time-constraint token to recover a public key;
   receiving, at the first computing device, a first password associated with a first user;
   deriving, by the first computing device and based on the first password, a private key;

deriving, by the first computing device and based on the private key and the public key, a second cryptographic key;
encrypting, by the first computing device and based on the second cryptographic key, the data to generate encrypted data; and
storing, by the first computing device, the encrypted data.

2. The method of claim 1, further comprising:
performing, by the first computing device, an error detection calculation on the data to generate first error detection data; and
combining the data and the first error detection data, wherein encrypting further comprises encrypting the combined data and the first error detection data to generate the encrypted data.

3. The method of claim 2, wherein combining further comprises concatenating the data and the first error detection data.

4. The method of claim 2, wherein combining further comprises interleaving, according to a predetermined interleaving pattern, the data and the first error detection data.

5. The method of claim 2, further comprising encoding, using Base64 encoding, the encrypted data.

6. The method of claim 1, wherein decrypting further comprises:
decrypting, based on the first cryptographic key, the first time-constraint token to recover first error detection data.

7. The method of claim 6, wherein the method further comprises:
performing, by the first computing device, an error detection calculation on the public key to generate second error detection data;
comparing the first error detection data to the second error detection data; and
determining that the first time-constraint token is valid when the first error detection data matches the second error detection data.

8. The method of claim 6, further comprising:
determining that the first time-constraint token is invalid as expired;
modifying the current system time to derive a modified current system time;
deriving, using the first key derivation function and based on the modified current system time and the predetermined shared secret, a modified first cryptographic key; and
decrypting, based on the modified first cryptographic key, the first time-constraint token to recover a modified public key and modified first error detection data.

9. The method of claim 6, wherein the predetermined shared secret is stored by each of the first computing device and the second computing device.

10. The method of claim 6, wherein the current system time is determined using an epoch converter.

11. The method of claim 1, wherein deriving the private key further comprises:
deriving, using a second key derivation function and based on the first password, a first block of data of a first desired size; and
deriving, using a third key derivation function and based on the first block of data, the private key.

12. The method of claim 1, further comprising:
receiving, at the second computing device, a second password associated with a second user;
deriving, using a second key derivation function and based on the second password, a first block of data of a first desired size;
deriving, using a third key derivation function and based on the first block of data, the public key;
performing, by the second computing device, an error detection calculation on the public key to generate error detection data;
combining the public key and the error detection data;
receiving, at the second computing device, the current system time and the predetermined shared secret associated with the first computing device and the second computing device;
deriving, using the first key derivation function and based on the current system time and the predetermined shared secret, the first cryptographic key;
encrypting, using the first cryptographic key, the combined public key and the error detection data, to generate output data;
encoding the output data to form the first time-constraint token; and
sending, from the second computing device and to the first computing device, the first time-constraint token.

13. The method of claim 1, further comprising:
receiving, at the second computing device, the encrypted data;
receiving, at the second computing device and from the first computing device, a second time-constraint token;
receiving, at the second computing device, the current system time and the predetermined shared secret associated with the first computing device and the second computing device;
deriving, at the second computing device, using the first key derivation function and based on the current system time and the predetermined shared secret, the first cryptographic key; and
decrypting, using the first cryptographic key, the second time-constraint token to recover a second public key;
performing an error detection calculation on the second public key to generate error detection data;
determining that the second time-constraint token is valid based on the error detection data;
deriving, by the second computing device, and based on a second private key and the second public key, a third cryptographic key, wherein the second private key is derived based on a second password associated with a second user;
decrypting, by the second computing device and based on the third cryptographic key, the encrypted data to recover the data; and
storing, by the second computing device, the data.

14. A computing device comprising:
one or more processors; and
memory storing instructions that, when executed by the one or more processors, cause the computing device to:
receive data to be encrypted;
receive, from a second computing device, a first time-constraint token;
receive, at the computing device, a current system time and a predetermined shared secret associated with the computing device and the second computing device;
derive, using a first key derivation function and based on the current system time and the predetermined shared secret, a first cryptographic key;

decrypt, using the first cryptographic key, the first time-constraint token to recover a public key;

receive, a first password associated with a first user;

derive, based on the first password, a private key;

derive, based on the private key and the public key, a second cryptographic key;

encrypt, based on the second cryptographic key, the data to generate encrypted data; and store, in the memory, the encrypted data.

15. The computing device of claim 14, wherein the instructions, when executed by the one or more processors, cause the computing device to:

perform an error detection calculation on the data to generate first error detection data; and combine the data and the first error detection data, wherein encrypting further comprises encrypting the combined data and the first error detection data to generate the encrypted data.

16. The computing device of claim 14, wherein the instructions, when executed by the one or more processors, cause the computing device to:

decrypt, based on the first cryptographic key, the first time-constraint token to recover first error detection data.

17. The computing device of claim 16, wherein the instructions, when executed by the one or more processors, cause the computing device to:

perform an error detection calculation on the public key to generate second error detection data;

compare the first error detection data to the second error detection data; and determine that the first time-constraint token is valid when the first error detection data matches the second error detection data.

18. One or more non-transitory computer-readable media storing instructions that, when executed by one or more processors, cause the one or more processors to perform steps comprising:

receive, at a first computing device, data to be encrypted;

receive, at the first computing device and from a second computing device, a first time-constraint token;

receive, at the first computing device, a current system time and a predetermined shared secret associated with the first computing device and the second computing device;

derive, using a first key derivation function and based on the current system time and the predetermined shared secret, a first cryptographic key; and decrypt, by the first computing device and using the first cryptographic key, the first time-constraint token to recover a public key;

receive, at the first computing device, a first password associated with a first user;

derive, by the first computing device and based on the first password, a private key;

derive, by the first computing device and based on the private key and the public key, a second cryptographic key;

encrypt, by the first computing device and based on the second cryptographic key, the data to generate encrypted data; and store, by the first computing device, the encrypted data.

19. The one or more non-transitory computer-readable media of claim 18, wherein the instructions, when executed by the one or more processors, cause the first computing device to:

derive, using a second key derivation function and based on the first password, a first block of data of a first desired size; and derive, using a third key derivation function and based on the first block of data, the private key.

20. The one or more non-transitory computer-readable media of claim 18, wherein the instructions, when executed by the one or more processors, cause the first computing device to:

perform, by the first computing device, an error detection calculation on the data to generate first error detection data; and combine the data and the first error detection data, wherein encrypting further comprises encrypting the combined data and the first error detection data to generate the encrypted data.

* * * * *